(12) United States Patent
Blanc

(10) Patent No.: US 10,094,701 B2
(45) Date of Patent: Oct. 9, 2018

(54) DEVICE FOR TRANSPORTING OBJECTS AND CONVEYING AND WEIGHING DEVICE PROVIDED WITH SUCH TRANSPORTING DEVICES

(71) Applicant: MAF AGROBOTIC, Montauban (FR)

(72) Inventor: Philippe Blanc, Montauban (FR)

(73) Assignee: MAF AGROBOTIC, Montauban (FR)

( * ) Notice: Subject to any disclaimer, the term of this patent is extended or adjusted under 35 U.S.C. 154(b) by 0 days.

(21) Appl. No.: 15/566,832

(22) PCT Filed: Apr. 4, 2016

(86) PCT No.: PCT/FR2016/050761
§ 371 (c)(1),
(2) Date: Oct. 16, 2017

(87) PCT Pub. No.: WO2016/166439
PCT Pub. Date: Oct. 20, 2016

(65) Prior Publication Data
US 2018/0100758 A1 Apr. 12, 2018

(30) Foreign Application Priority Data

Apr. 17, 2015 (FR) ..................................... 15 53455

(51) Int. Cl.
*B65G 17/16* (2006.01)
*G01G 13/22* (2006.01)
(Continued)

(52) U.S. Cl.
CPC ............ *G01G 13/22* (2013.01); *B65G 17/12* (2013.01); *B65G 47/962* (2013.01); *B65G 2201/0211* (2013.01)

(58) Field of Classification Search
CPC ....... B65G 17/16; B65G 47/962; G01G 13/22
(Continued)

(56) References Cited

U.S. PATENT DOCUMENTS 3,848,728 A * 11/1974 Leibrick ................... B61B 9/00
198/370.04
4,089,404 A * 5/1978 Venzke ................ B65G 47/962
198/370.04
(Continued)

FOREIGN PATENT DOCUMENTS

AU 701 354 B2 1/1999
EP 0 540 126 A1 5/1993
(Continued)

OTHER PUBLICATIONS

International Search Report, dated Jun. 15, 2016, from corresponding PCT/FR2016/050761 application.

*Primary Examiner* — Douglas A Hess
(74) *Attorney, Agent, or Firm* — Young & Thompson

(57) ABSTRACT

Disclosed is an object transporting device for objects such as fruits or vegetables including a receptacle suitable for receiving at least one object, a support and a connecting mechanism for connecting the receptacle to the support in order to interlock them in longitudinal translation, permit a lateral tilting of the receptacle for the purpose of laterally discharging each object carried by the receptacle, and allow a displacement of the receptacle in vertical translation for the weighing of the receptacle and of the object which it carries. The connecting mechanism includes at least one ball interposed and imprisoned between at least one vertical bearing surface of the receptacle and at least one vertical bearing surface of the support in order to be able to roll without sliding on at least one of these vertical bearing surfaces. Also disclosed is a conveying and weighing device equipped with such transporting devices.

20 Claims, 9 Drawing Sheets

Figure 1:
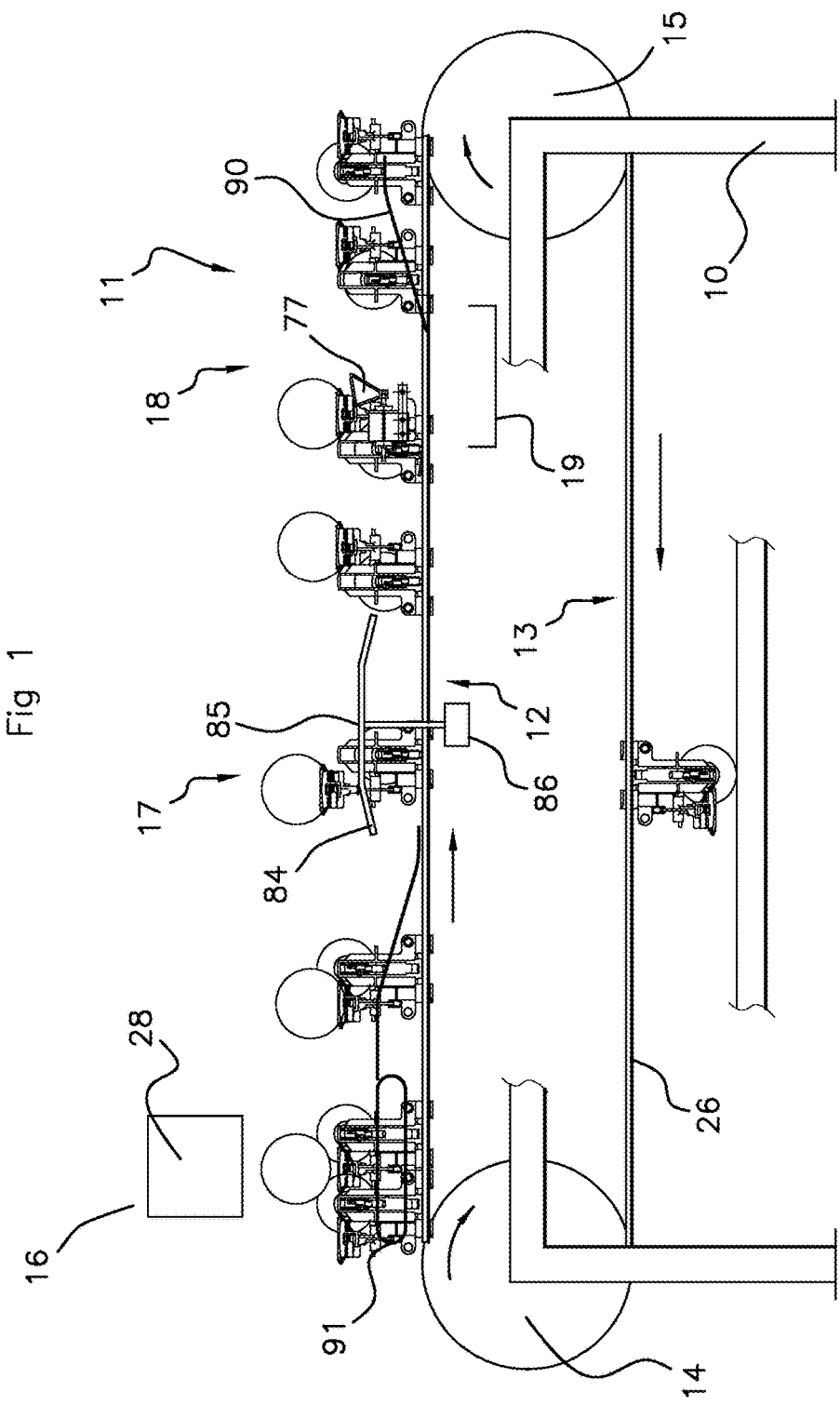

(51) Int. Cl.
*B65G 17/12* (2006.01)
*B65G 47/96* (2006.01)

(58) Field of Classification Search
USPC .......... 198/370.04, 477.1, 706, 803.14, 959; 209/592, 912
See application file for complete search history.

(56) References Cited

U.S. PATENT DOCUMENTS

| | | | | |
|---|---|---|---|---|
| 5,306,877 | A | 4/1994 | Tas | |
| 5,477,955 | A * | 12/1995 | Madden | B07B 13/16 198/370.04 |
| 5,677,516 | A * | 10/1997 | Leverett | B07C 5/18 177/145 |
| 5,901,854 | A * | 5/1999 | Ishii | B65G 47/38 198/370.04 |
| 6,234,297 | B1 * | 5/2001 | Blanc | B65G 47/965 198/370.04 |
| 6,374,983 | B1 * | 4/2002 | Morigi | B65G 47/965 198/370.04 |
| 6,460,681 | B1 * | 10/2002 | Coutant | B07C 3/06 198/370.03 |
| 6,691,854 | B1 * | 2/2004 | De Greef | A23N 15/00 198/377.01 |
| 7,222,715 | B2 * | 5/2007 | Madden | B07C 5/36 177/145 |
| 7,395,914 | B2 * | 7/2008 | van Wijngaarden | B65G 47/962 198/370.04 |
| 7,410,044 | B2 * | 8/2008 | Kennedy | B07C 5/362 198/370.04 |
| 8,714,365 | B2 * | 5/2014 | Morley | B07C 5/36 209/606 |
| 8,746,435 | B2 * | 6/2014 | Nijland | B07C 5/18 198/370.04 |
| 8,807,320 | B2 * | 8/2014 | Fortenbery | B65G 47/962 198/370.03 |
| 8,851,267 | B2 * | 10/2014 | Sotelo | B65G 17/12 198/370.04 |
| 9,004,287 | B2 * | 4/2015 | Liedl | B07C 5/16 209/541 |
| 9,527,113 | B2 * | 12/2016 | Kennedy | B07B 13/08 |
| 9,527,680 | B2 * | 12/2016 | Anstis | B07C 5/36 |

FOREIGN PATENT DOCUMENTS

| | | |
|---|---|---|
| EP | 0 580 784 B1 | 2/1994 |
| EP | 1 083 008 A1 | 3/2001 |
| EP | 1 689 536 B1 | 8/2006 |
| FR | 2 960 866 A1 | 12/2011 |
| WO | 00/71446 A1 | 11/2000 |
| WO | 2005/037453 A1 | 4/2005 |

* cited by examiner

DEVICE FOR TRANSPORTING OBJECTS AND CONVEYING AND WEIGHING DEVICE PROVIDED WITH SUCH TRANSPORTING DEVICES

The invention relates to an object transporting device for objects such as fruits or vegetables comprising a receptacle for receiving at least one object—in particular a single object—, a support which can be associated with a driving device for driving along a direction, named the longitudinal direction, and a connecting mechanism for connecting the receptacle to the support permitting, on the one hand, the lateral tilting of the receptacle with respect to the support for the purpose discharging each object carried by the receptacle, and, on the other hand, a relative displacement of the receptacle upwards with respect to the support for the purpose of weighing each object carried by the receptacle. It also relates to an object conveying and weighing—in particular sorting—device for objects such as fruits or vegetables equipped with at least a plurality of such transporting devices.

There are already known conveying devices comprising object transporting devices for transporting objects such as fruits or vegetables comprising receptacles, arranged along a conveying line—in particular interposed between conveying rollers with transverse axes of the conveying line—and which, on the one hand, are tiltable laterally on at least one side of the conveying line and, on the other hand, are mounted with possibilities of vertical displacements so as to permit the weighing when passing directly in line with a weighing station of the conveying device.

When these transporting devices are used for sorting the objects, the receptacles are tiltable laterally on at least one side of the conveying line. The known tiltable weighing receptacles all have various disadvantages. Firstly, the connecting mechanism permitting the vertical displacements for the weighing often prevents possibilities of tilting on both sides of the conveying line, thereby considerably limiting the operating flexibility and the performance of the conveying device. For, the conveying device permits in particular the sorting of the objects and the fact of tilting the receptacles to one side and the other increases the number of object receiving stations for their sorting or enables reduction of the length of the device for a same number of receiving stations. More generally, possibilities of tilting on both sides enable adaptation of a same receptacle to different configurations of conveying devices.

Furthermore, in the known transporting devices, the connecting mechanism for connecting each receptacle to its support has kinematics (protruding slides, rotary guidance . . . ) which are complex, bulky, require a large number of parts, and often interfere with those of the weighing members and/or generate undesirable friction reactions, adversely affecting the precision of the weighing.

It should be noted in this regard that it is important that the weighing members cooperate directly and solely with the receptacle, and in particular that the connecting mechanism is not itself supported by the weighing members, not only so that the mass supported by the weighing members is as low as possible, but also in order in particular to avoid any relative movement liable to cause inertia forces and any unintended tilting during the weighing.

In certain known devices, the receptacle is articulated with respect to the support about at least one longitudinal axis (FR2960866) or transverse axis (WO2005037453), or even a deformable parallelogram (U.S. Pat. No. 5,306,877), the weighing being carried out by pivoting of at least one part of the mechanism about such an axis. This type of mounting poses the problem of an absence of linearity owing to the rotation and friction in the pivoting axes which may result in imprecision of the weighing, in particular in the humid and/or dirty environments such as agricultural installations. Moreover, the weighing members often form four weighing points of the receptacle for the purpose of the weighing. In most cases, at least three different weighing points are necessary. This results in a weighing station which is complex and liable to instabilities. For, it is very difficult to ensure that the three or four weighing points are perfectly coplanar and remain so during the lifetime of the machine.

In other known transporting devices, the receptacles are formed solely of transverse rollers adapted to permit the weighing and which are tiltable laterally for the discharging. Here too, the weighing requires four weighing points. These known transporting devices also have the disadvantage of a relative complexity of the mounting of the rollers, and are therefore of considerable cost and/or of lower weighing quality in terms of precision, accuracy and reliability over time, owing to the four weighing points.

In all the known transporting devices, the connecting mechanism is therefore particularly complex, bulky in height, requires a large number of parts, of contorted shapes, which are costly to manufacture, generate a high tare, are sources of malfunctions and liable to interfere with the weighing, adversely affecting its precision, its accuracy and its reliability.

The invention therefore aims to overcome these disadvantages by proposing a transporting device in which the connecting mechanism is simple, comprises a small number of parts, and providing guidance which is reliable, precise and without friction of each receptacle with respect to its support, permitting a lateral tilting—in particular a bilateral tilting—and a precise and accurate weighing of each receptacle and of each object.

The invention also aims to propose such a transporting device in which the connecting mechanism is not bulky in height.

The invention also aims to propose such a transporting device in which the receptacle in the weighing position is precisely guided and maintained with respect to the support and with respect to the weighing members. The invention also aims to propose such a transporting device in which the weighing tare (unladen mass supported by the weighing members) is low.

The invention therefore relates to an object transporting device comprising a receptacle suitable for receiving at least one object, a support which can be associated with a driving device for driving along a direction, named the longitudinal driving direction, and a connecting mechanism for connecting the receptacle to the support, this connecting mechanism being configured to:
  interlock the receptacle and the support in longitudinal translation,
  permit a lateral tilting of the receptacle for the purpose of laterally discharging each object carried by the receptacle,
  and allow a relative displacement of the receptacle in vertical translation with respect to the support with a stroke adapted for the weighing of the receptacle and of the object(s) which it carries,
wherein said connecting mechanism comprises at least one ball interposed and imprisoned between at least one bearing surface of the receptacle and at least one bearing surface of the support in order to be able to roll without sliding vertically on at least one of these bearing surfaces.

Throughout the text, the term "direction" is used in the ordinary sense of the term and not in the mathematical sense, that is to say denotes an orientation including a direction. The terms "front" and "rear" and their derivatives are used with reference to the longitudinal direction, a front member being situated downstream in the direction of displacement along the longitudinal direction with respect to a rear member.

Advantageously and according to the invention, at least one of said bearing surfaces—in particular each bearing surface—is a bearing surface, named the vertical bearing surface, extending vertically over a distance greater than the diameter of a ball cooperating with this vertical bearing surface, to permit a relative vertical displacement of this ball rolling without sliding along this vertical bearing surface.

The invention thus provides rigid precise and constant supporting of the receptacle with respect to the support in the longitudinal driving direction, permitting a continuous driving in translation without risk of jerks, and a guiding of the relative displacements of the receptacle with respect to the support, both in rotation during the tilting and in vertical translation during the weighing, via at least one ball of this connecting mechanism which can serve both as a pivot and can roll without sliding on at least one vertical bearing surface of the receptacle and/or of the support. This results in a particularly simple connecting mechanism, formed of a small number of parts, which is compact, reliable, does not interfere with the weighing and therefore does not adversely affect its precision, nor its accuracy, nor its sensitivity, and is compatible with a bilateral tilting of the receptacle.

In particular, it is possible to realise a transporting device according to the invention in such a way that the guidance of the receptacle with respect to the support in the high, weighing position takes place solely via one or more balls rolling without sliding, that is to say substantially without friction. In other words, the connecting mechanism for connecting a transporting device according to the invention can be configured in such a way that at least in the high, weighing position the receptacle and the support are in contact mainly—in particular exclusively—via at least one ball rolling without sliding on at least one vertical bearing surface of the receptacle and/or of the support and not inducing any vertical reaction on the receptacle.

Furthermore, advantageously and according to the invention, at least one vertical bearing surface is a transverse bearing surface, that is to say adapted to produce a bearing reaction resultant of a ball on this bearing surface which is oriented along the longitudinal driving direction. For example, such a transverse vertical bearing surface has a vertical plane rolling track orthogonal to the longitudinal driving direction, or two vertical lateral rolling tracks symmetrical to one another with respect to a longitudinal plane and not parallel to the longitudinal driving direction.

Each ball is imprisoned in the connecting mechanism between at least two bearing surfaces—in particular between at least two vertical bearing surfaces—of the receptacle and of the support, but free to roll without sliding vertically against at least one of these bearing surfaces. These bearing surfaces are at least partly opposite one another in the longitudinal driving direction so that each ball is capable of transmitting longitudinal forces—in particular driving forces in longitudinal translation and/or inertia forces—between the receptacle and the support.

Furthermore, in certain embodiments, advantageously and according to the invention, a single ball is interposed and imprisoned between at least one pair of bearing surfaces comprising a bearing surface of the receptacle and a bearing surface of the support. Nevertheless, in a variant or in combination, provision may be made for a plurality of balls interposed and imprisoned between at least one pair of such bearing surfaces.

Moreover, in certain embodiments, advantageously and according to the invention, the transporting device is also characterised in that the connecting mechanism for connecting a pair of parts formed of a receptacle and of a support has:
- a front vertical bearing surface and a rear vertical bearing surface of one of these two parts, these front and rear vertical bearing surfaces being spaced from one another along the longitudinal direction,
- at least one ball, named the anteroposterior ball, enclosed in a vertical slot of the other part passing through the thickness of the latter in the longitudinal direction, this anteroposterior ball having diameter less than the spacing of said front and rear vertical bearing surfaces, and greater than the thickness of said vertical slot in the longitudinal direction so as to be able to come into contact with one of the front and rear vertical bearing surfaces.

The spacing of said front and rear vertical bearing surfaces is therefore greater than the thickness of said other part around said vertical slot. The receptacle is therefore mounted with a longitudinal clearance which is not zero (but as low as possible to permit the rolling of the ball) with respect to the support. But this clearance is eliminated in operation under the effect of the inertia forces. The diameter of each anteroposterior ball is also less than the length of the vertical slot and of said front and rear vertical bearing surfaces to permit the rolling of this ball along the vertical slot and said front and rear vertical bearing surfaces.

Advantageously, in certain embodiments and according to the invention, the vertical slot has an open upper end permitting the mounting of each anteroposterior ball, preferably by engagement with force by elastic deformation of opposite edges of this upper end so as to prevent any subsequent unintentional extraction of the anteroposterior ball from the vertical slot. Said vertical slot also advantageously has concave profiled lateral rolling tracks shaped to retain between them each anteroposterior ball and permit the rolling of this ball in the vertical slot.

Furthermore, in certain embodiments, advantageously and according to the invention, each vertical slot receives a single anteroposterior ball. Nevertheless, provision may be made in a variant for a plurality of anteroposterior balls in at least one vertical slot.

Advantageously and according to the invention, at least one vertical slot is provided in the support and said front and rear vertical bearing surfaces are provided on the receptacle. In a variant or in combination, at least one vertical slot is provided in the receptacle and said front and rear bearing surfaces are provided on the support.

Moreover, advantageously and according to the invention, at least one vertical slot and said front and rear bearing surfaces are situated at the top part of the connecting mechanism, at least one anteroposterior ball therefore providing a guidance between the receptacle and the support at the top part of the support.

Furthermore, in certain embodiments, advantageously and according to the invention, a transporting device according to the invention has two vertical slots spaced laterally from one another, each comprising at least one anteroposterior ball. Advantageously and according to the invention, the two vertical slots extend in a same transverse plane and at the top part of said other part.

These two vertical slots and said front and rear vertical bearing surfaces and the corresponding anteroposterior balls of a connecting mechanism of a transporting device according to certain advantageous embodiments of the invention provide a stable lateral guidance while maintaining the alignment with the longitudinal direction during the relative vertical displacements of the receptacle with respect to the support, and also participate in the guidance during the lateral tilting.

Furthermore, in certain embodiments, advantageously and according to the invention the connecting mechanism for connecting a pair of parts formed of a receptacle and of a support has at least one front ball interposed and imprisoned between at least one front bearing surface of the receptacle and at least one front bearing surface of the support in order to be able to roll without sliding vertically on and between these front bearing surfaces. One of these front bearing surfaces is oriented downstream with reference to the longitudinal direction, while the other front bearing surface is oriented upstream with reference to the longitudinal direction. A slight longitudinal clearance (not zero but as small as possible to permit the rolling of the ball) may be provided between these front bearing surfaces. Preferably, in contrast, each front ball is in rolling contact with each of the front bearing surfaces, without longitudinal clearance. Advantageously and according to the invention, said front bearing surfaces define at least one vertical rolling track for a front ball of the connecting mechanism. At least one of the front bearing surfaces is therefore a vertical bearing surface.

Likewise, in certain embodiments, advantageously and according to the invention the connecting mechanism for connecting a pair of parts formed of a receptacle and of a support has at least one rear ball interposed and imprisoned between at least one rear bearing surface of the receptacle and at least one rear bearing surface of the support in order to be able to roll without sliding vertically on and between these rear bearing surfaces. One of these rear bearing surfaces is oriented downstream with reference to the longitudinal direction, while the other rear bearing surface is oriented upstream with reference to the longitudinal direction. A slight longitudinal clearance (not zero but as small as possible to permit the rolling of the ball) can be provided between these rear bearing surfaces. Preferably, in contrast, each rear ball is in rolling contact with each of the rear bearing surfaces, without longitudinal clearance. Advantageously and according to the invention, said rear vertical bearing surfaces define at least one vertical rolling track for a rear ball of the connecting mechanism. At least one of the rear bearing surfaces is therefore a vertical bearing surface.

Furthermore, in certain embodiments, advantageously and according to the invention the connecting mechanism for connecting a pair of parts formed of a receptacle and of a support comprises a pivot with a longitudinal axis permitting a lateral tilting of the receptacle to at least one side of the support for the purpose of discharging the objects. Advantageously and according to the invention, said longitudinal pivot is at least partly formed of a ball interposed between a vertical bearing surface of the receptacle oriented upstream with reference to the longitudinal driving direction and a vertical bearing surface of the support oriented downstream with reference to the longitudinal driving direction.

Furthermore, in certain embodiments, advantageously and according to the invention the connecting mechanism is adapted to permit a tilting of the receptacle to each side of the support. It is therefore a connecting mechanism with bilateral tilting. Moreover, advantageously and according to the invention the connecting mechanism comprises a locking of the receptacle in the central and low transporting position with respect to the support.

Furthermore, in certain embodiments, advantageously and according to the invention each receptacle is a small dish adapted to receive individually an object. These may advantageously be small cups or hands for transporting individually objects such as fruits or vegetables. Nevertheless, the invention also applies to other types of receptacles, capable of receiving a plurality of objects each.

In a transporting device according to the invention, during the vertical relative displacements of the receptacle with respect to the support in order to move to the weighing position, and to return to the low, transporting position, the receptacle is guided with respect to the support and in the contact with the latter mainly—in particular exclusively—via balls—in particular at least three balls, preferably four balls—rolling without sliding on at least one vertical bearing surface. This results in zero or negligible friction, no vertical reaction on the receptacle induced by the connecting mechanism, which therefore does not interfere with the weighing, and a reliable, stable and precise guidance. All of this is obtained for a very small number of parts, namely only the two parts formed of the receptacle and of the support, as well as the balls.

The invention also extends to an object conveying and weighing device comprising:
  an endless chain having a horizontal upper section,
  a driving device for driving with continuous running of the endless chain along a longitudinal driving direction of said upper section,
  object transporting devices distributed along the endless chain, carried by the latter and interlocked in translation with the latter, each transporting device comprising a receptacle suitable for receiving at least one object, a support connected to the driving device in order to be driven by the latter along the longitudinal driving direction, and a connecting mechanism for connecting the receptacle to the support, this connecting mechanism being configured to:
    interlock the receptacle and the support in longitudinal translation,
    permit a lateral tilting of the receptacle with respect to the support for the purpose of laterally discharging each object carried by the receptacle,
    and allow a relative displacement of the receptacle upwards with respect to the support with a stroke adapted for the weighing of the receptacle and of the object(s) which it carries,
  at least one weighing station comprising, on said upper section of the endless chain:
    at least one slide arranged along a portion of said upper section of the endless chain in order to be able to cooperate with the receptacles so as to displace them with respect to the supports vertically upwards into the high, weighing position,
    and at least one weighing device for weighing the receptacles in the high, weighing position,
  wherein each object transporting device is a transporting device according to the invention.

In an object conveying and weighing device according to the invention, the weighing device associated with the slides cooperates directly and solely with the receptacles in the weighing position.

An object conveying and weighing device according to the invention can be equipped with at least one simplified weighing device. Thus, advantageously and according to the invention, an object conveying and weighing device comprises at least one weighing station comprising weighing members adapted to cooperate with the conveying receptacles so as to support them temporarily for the purpose of the weighing. Advantageously, in an object conveying and weighing device according to the invention, each weighing device is adapted to support the receptacle solely at two weighing points situated on one side and on the other—in particular symmetrically—of a longitudinal median plane of the receptacle.

Furthermore, in certain advantageous embodiments of an object conveying and weighing device according to the invention each receptacle is interposed on the endless chain between two rollers mounted freely rotatably about transverse axes of rotation driven in translation along the longitudinal direction by said endless chain.

Thus, an object conveying and weighing device according to the invention comprises at least one conveying line comprising rollers interposed between the conveying receptacles and adapted to guide and/or drive the conveying line with respect to at least portions of a frame and/or to support temporarily the objects in at least one portion of a journey of the latter. Such a conveying line, named a single line, makes it possible to carry out all the analyses of the objects, including the optical analyses and their weighing, then their sorting by discharging into sorting reception stations, without transferring the objects from one conveying line to another.

In certain embodiments, advantageously and according to the invention, each roller is mounted so as to be displaceable in vertical translation with respect to the endless chain, a pair of successive rollers being displaceable upwards to take over an object initially supported by a receptacle. Such rollers can also cooperate with a device for driving in rotation these rollers about their axis, so as to rotate an object supported between these rollers, for example for purposes of optical analysis of the object.

Advantageously, in certain embodiments the receptacle and the rollers which adjoin them in the longitudinal direction fit into each other, each roller being formed of a plurality of parallel discs mounted on the axis of rotation, the receptacle comprising slots permitting the passage of each disc of each roller which adjoins it.

In certain embodiments, advantageously and according to the invention each support of a transporting device according to the invention carries a receptacle and an adjacent roller.

Moreover, advantageously and according to the invention said endless chain is formed by the supports of the transporting devices articulated to one another in pairs successively in the longitudinal direction, each support thus forming a link of the chain. An object conveying and weighing device according to the invention can thus be formed of a very small number of parts, which can be formed of moulded synthetic material (with the exception possibly of the pins for articulation of the supports to one another, the shafts for rotation of the rollers, and longitudinal metal reinforcements insertable into the supports), while providing advanced functions and outstanding performance, in particular as regards the weighing and the sorting of the objects.

An object conveying and weighing device according to the invention can comprise a single conveying line (with a single endless chain) comprising such receptacles, in particular interposed between conveying rollers with transverse axes driven in longitudinal translation with the receptacles. Nevertheless, in contrast, provision may be made for a plurality of parallel conveying lines.

An object conveying and weighing device according to the invention can form or be part of a unit for sorting objects such as fruits or vegetables according to their weight in particular. This unit may, for example, advantageously be a fruit or vegetable grader. It then has, downstream of at least one object weighing station—and preferably at least one optical analysing station and/or other object sorting criteria—, a plurality of lateral discharging zones for the transported objects and devices controlled for selective tilting of the receptacles opposite each lateral discharging zone on control of a central sorting unit connected to the weighing station and to these devices controlled for selective tilting.

The invention also relates to an object transporting device and an object conveying and weighing device characterised in combination by all or part of the features mentioned above or below.

Figure 2:
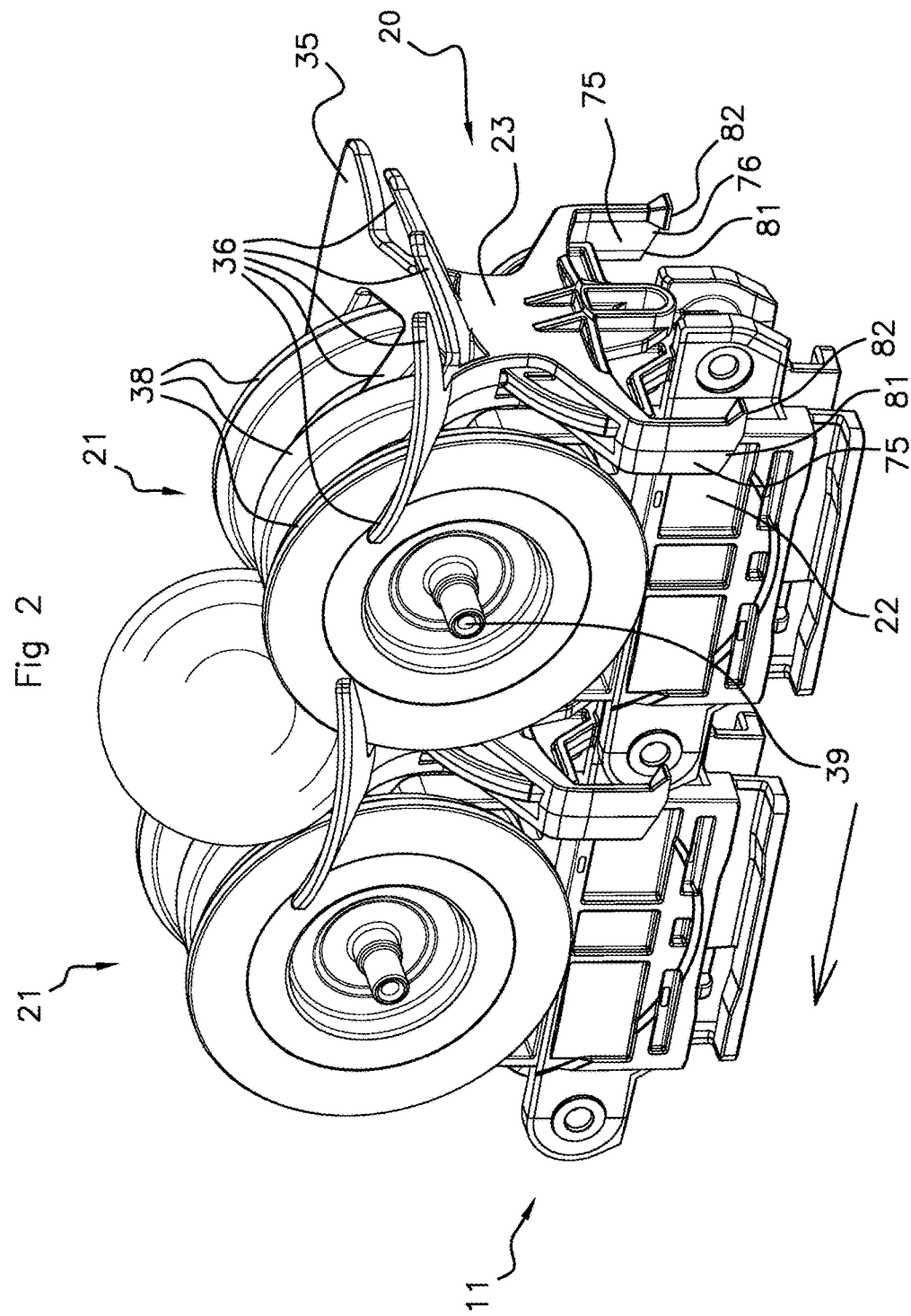
Figure 3:
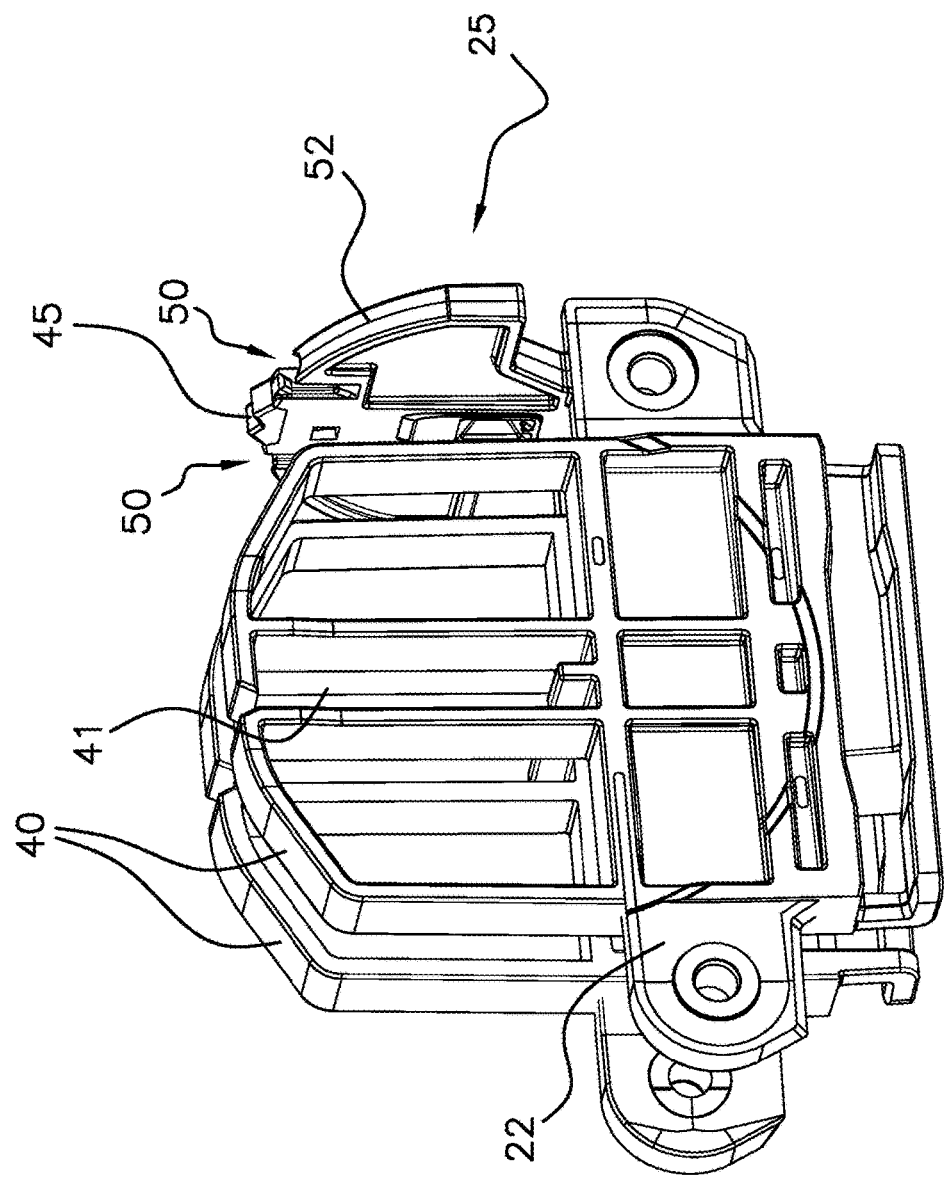
Figure 4:
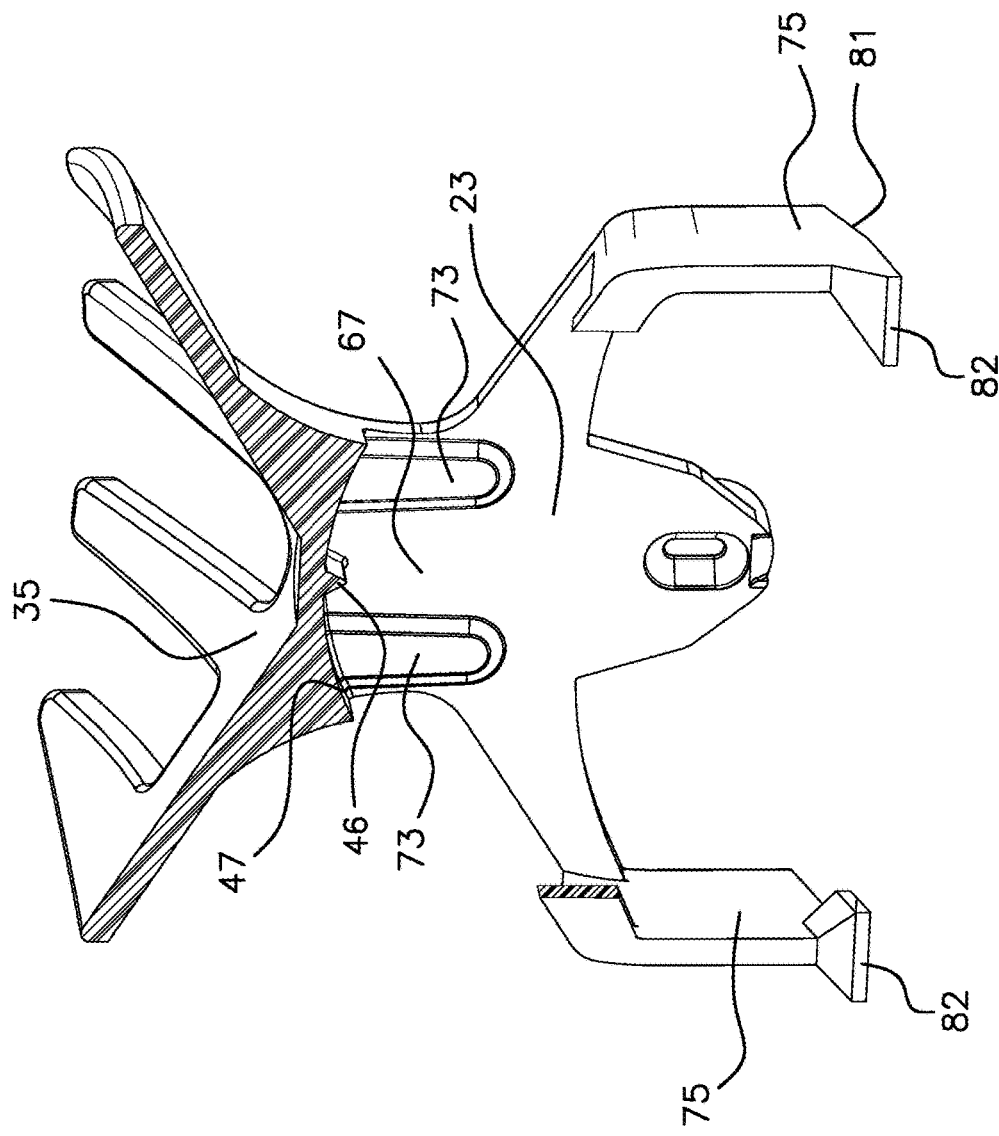
Figure 5:
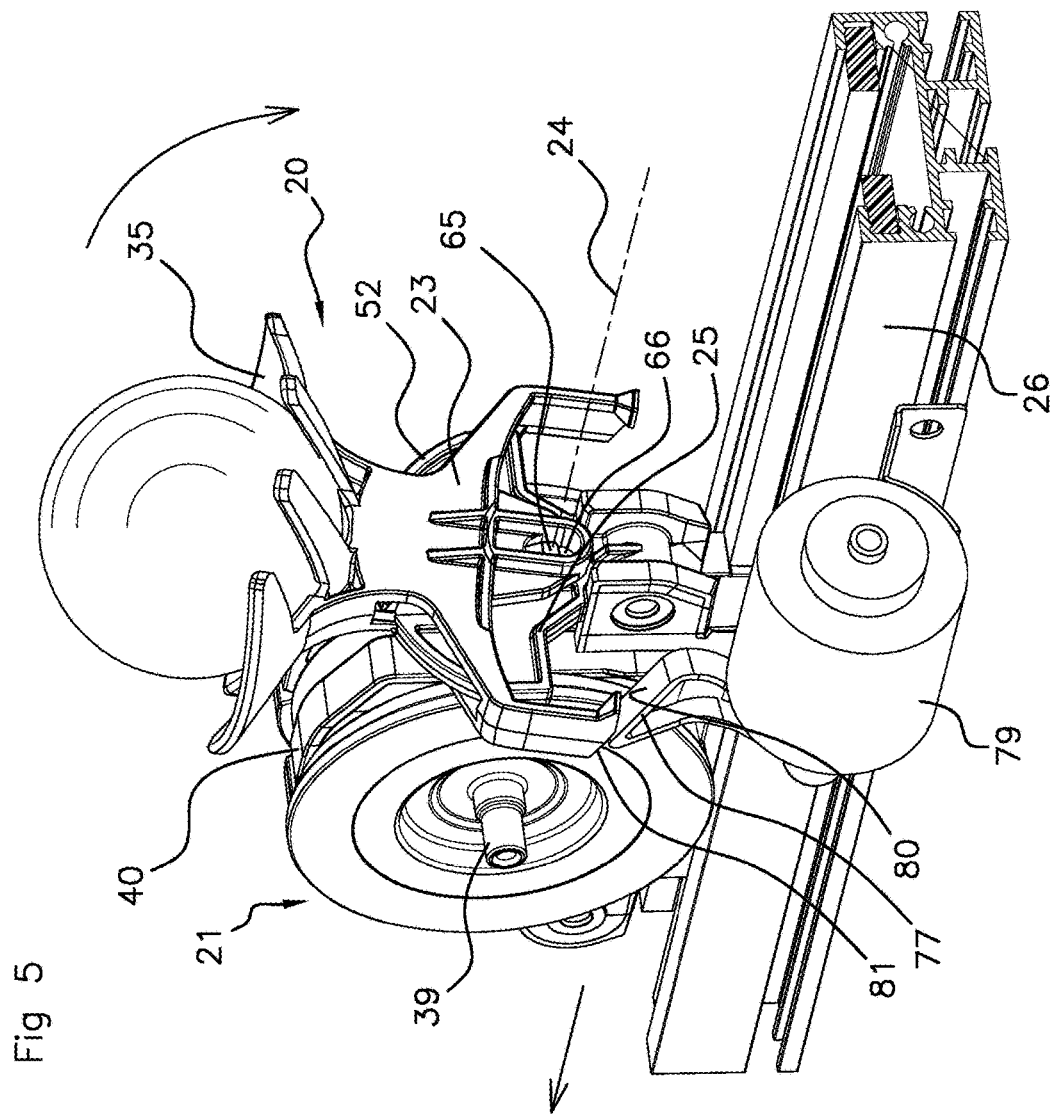
Figure 6:
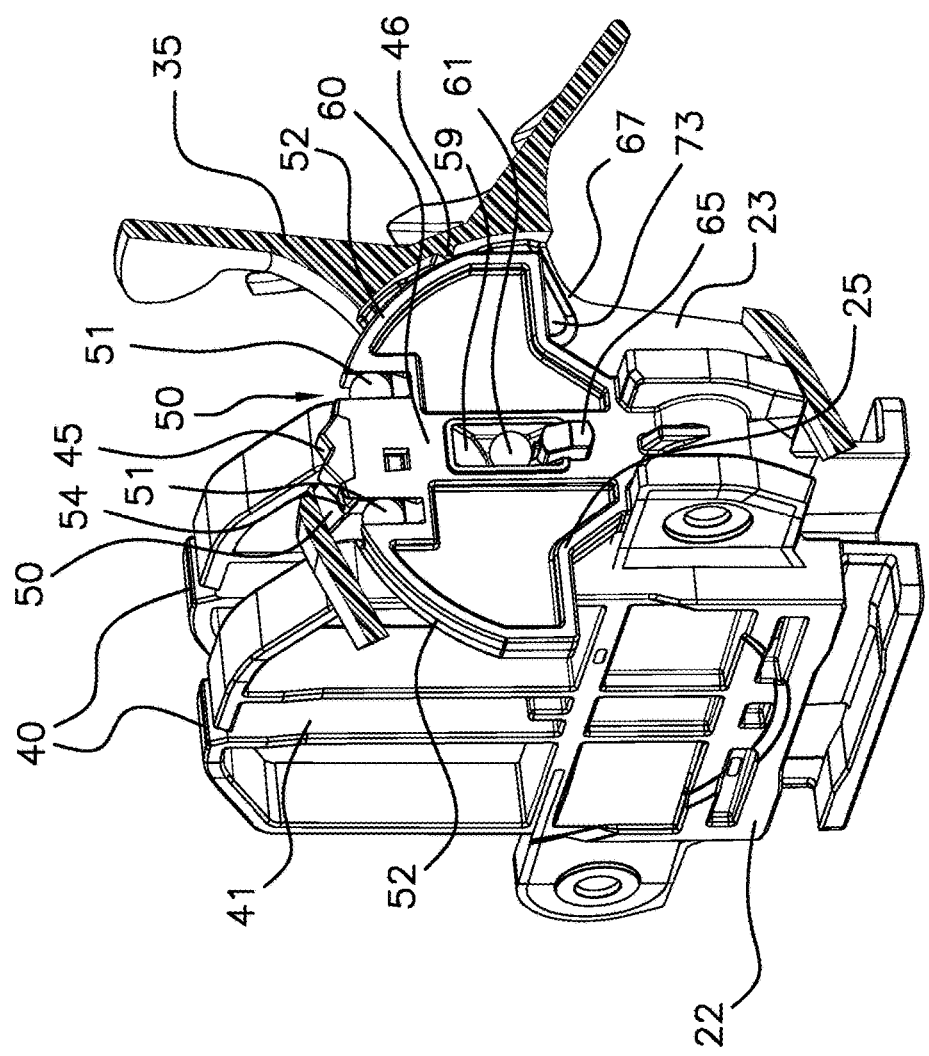
Figure 7:
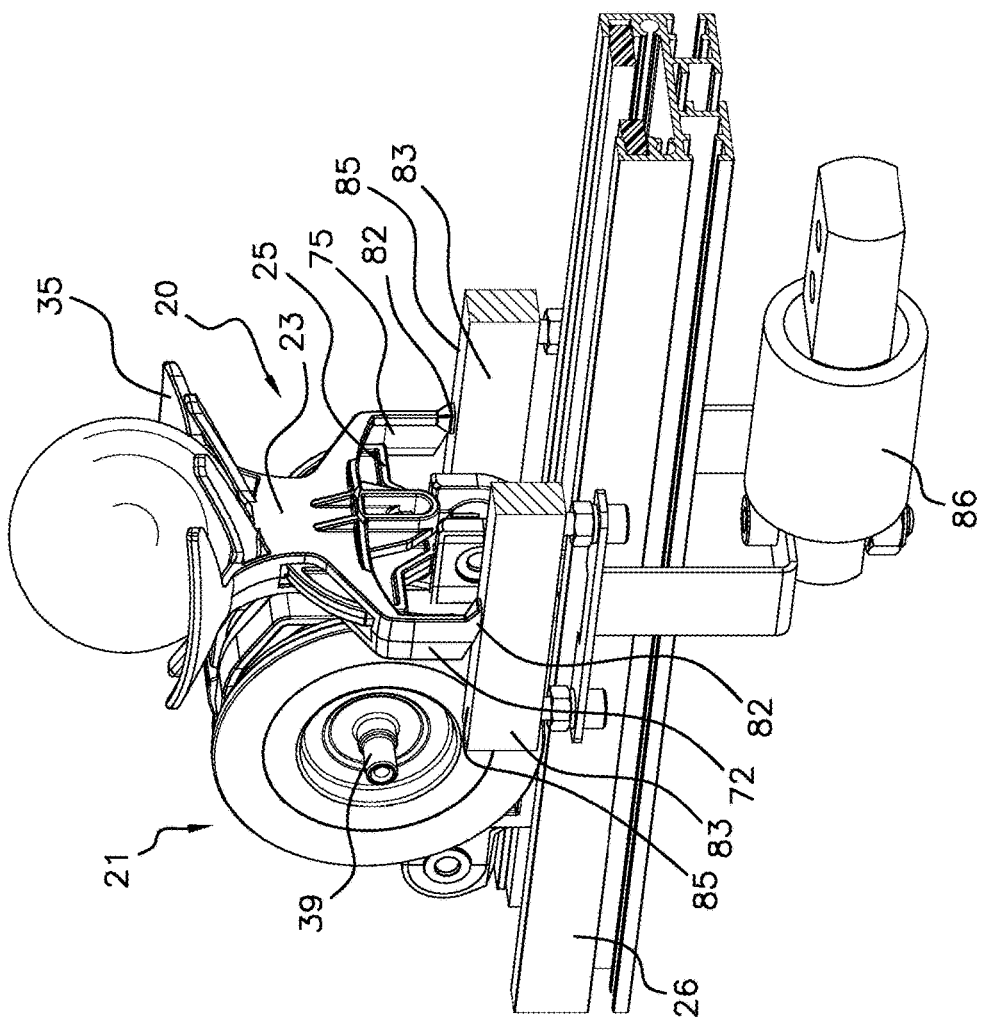
Figure 8:
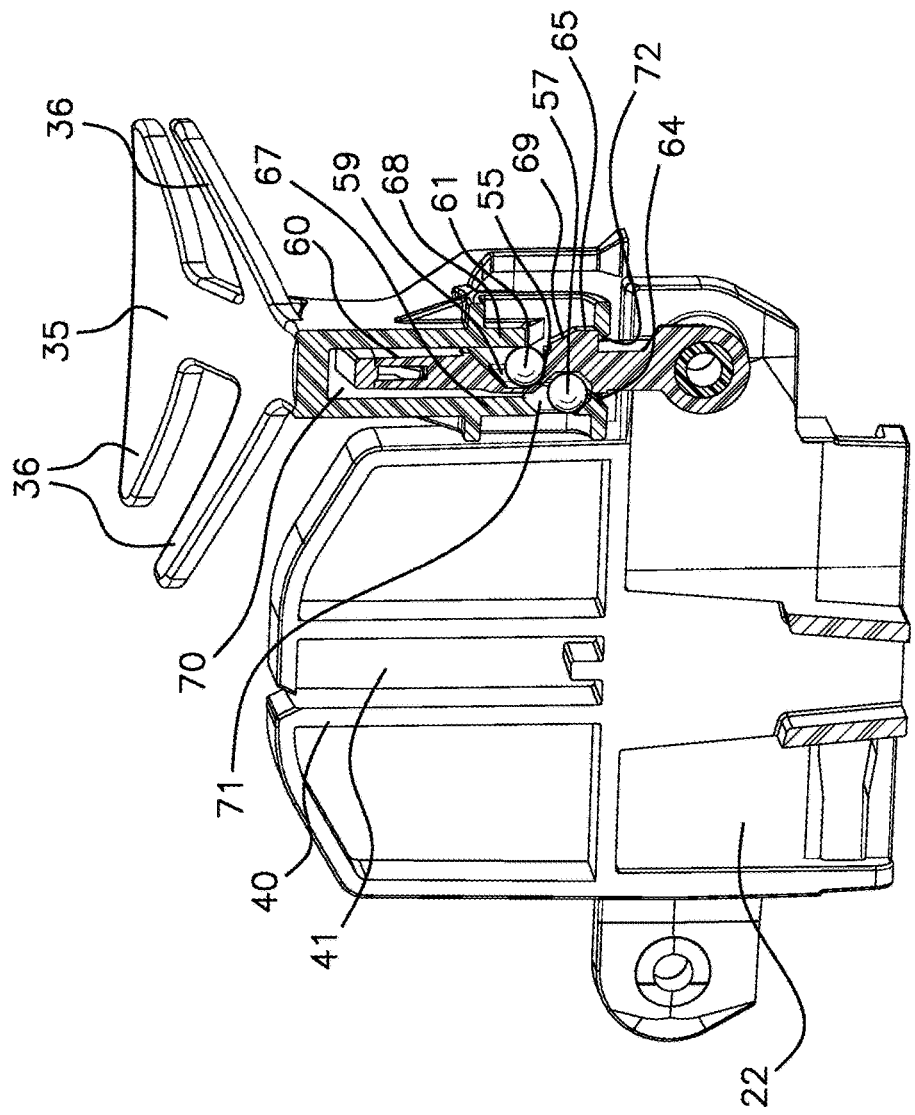
Figure 9:
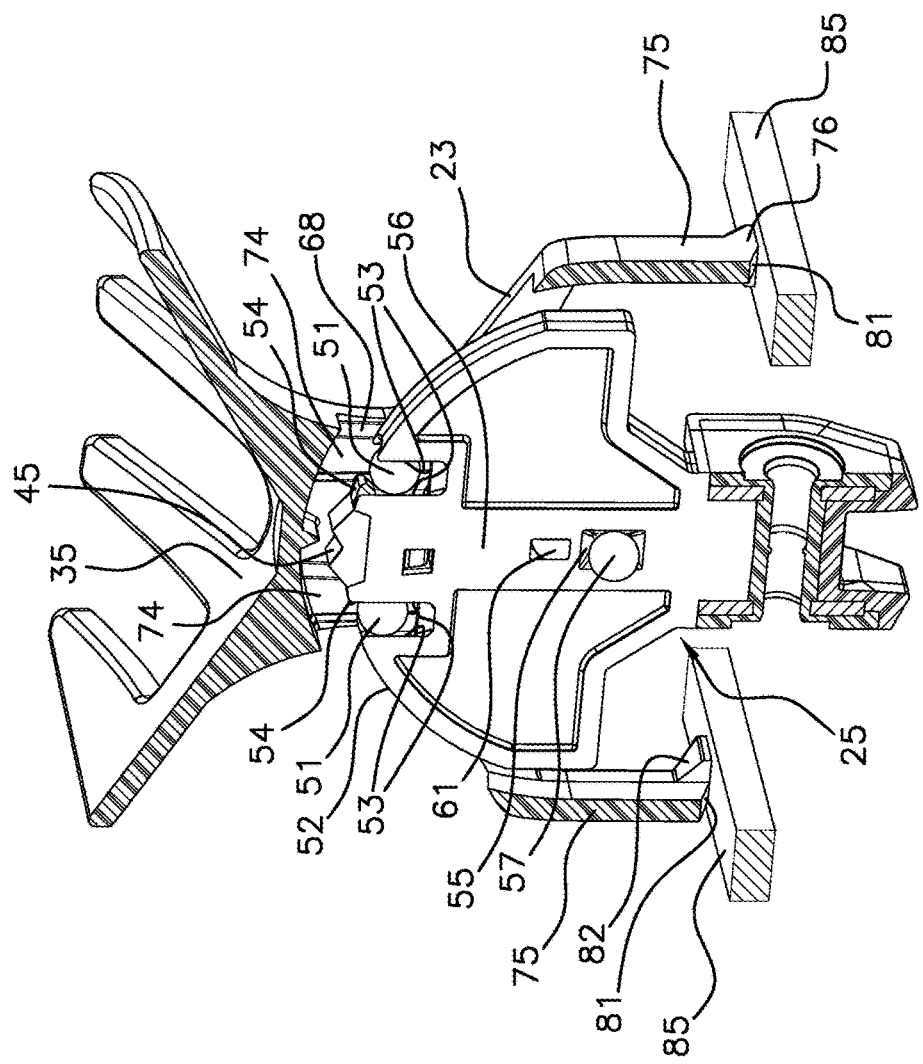

Other aims, features and advantages of the invention will become apparent on reading the following description given without limitation and which refers to the appended figures in which:

FIG. 1 is an elevation diagram of a conveying, weighing and sorting device according to the invention, FIG. 2 is a perspective diagram showing two transporting devices according to the invention connected to one another to form a portion of an endless chain of a conveying, weighing and sorting device according to the invention, FIG. 3 is a perspective diagram showing a moulded part forming a support of a transporting device according to the invention, FIG. 4 is a perspective diagram showing, partially cutaway at the rear, a moulded part forming a receptacle of a transporting device according to the invention, FIG. 5 is a perspective diagram showing a transporting device according to the invention at the beginning of lateral tilting, FIG. 6 is a perspective diagram showing, partially cutaway at the rear, a transporting device according to the invention at the end of lateral tilting, the roller not being shown, FIG. 7 is a perspective diagram showing a transporting device according to the invention in the high, weighing position, FIG. 8 is a perspective and median longitudinal sectional diagram showing a transporting device according to the invention in the high, weighing position, the roller not being shown, FIG. 9 is a perspective and transverse sectional diagram showing a foot of the support and a receptacle of a transporting device according to the invention in the high, weighing position.

The object conveying, analysing and sorting device shown schematically by way of example in FIG. 1 (in this figure the scales are not observed, for purposes of illustration) comprises a frame 10 and a single endless chain 11 forming an endless loop which, in the example, is formed of a plurality of supports 22 articulated to one another in pairs successively by transverse pins all parallel to one another. Each support 22 is thus a link of the chain. Nevertheless, it should be noted that, in a variant not shown, provision may be made for the supports 22 to serve not as links of the endless chain 11, but to be riders carried and driven by interconnected links of an endless chain.

The chain 11 extends along a longitudinal direction orthogonal to the articulation pins of the supports 22. The chain 11 cooperates with two end drums 14, 15 so as to form an endless loop and to have an upper outward section 12 generally horizontal and a lower return section 13 likewise generally horizontal extending below the outward section 12 and directly in line with the latter.

At least one of the two drums 14, 15 is rotationally driven with respect to the frame 10 by a motor device (not shown), so that the endless chain 11 is likewise driven continuously along its longitudinal direction and in one direction by this drum with respect to the frame 10.

The upper section 12 comprises, in the example shown, successively an optical analysing station 16, a weighing station 17, a sorting station by tilting 18. The objects to be sorted are received at the entrance of the outward section 12 upstream of the optical analysing station 16 in receptacles 20 carried by the supports 22. They pass opposite the various stations of the upper section and are delivered into one of a plurality of receiving stations 19 supplied selectively by the sorting station 18.

In the example shown, the endless chain 11 carries receptacles 20 and rollers 21 interposed between the receptacles 20. Besides the endless chain 11, the device is also equipped with rails for guiding the chain and/or the conveying receptacles 20 and/or the rollers 21. Thus, the supports 22 are advantageously received and guided in longitudinal translation in a rail 26 defining the upper section.

The general features of such a conveying line are well known per se (cf. for example FR2960866, EP0580784, EP1689536 . . . ) so that the rest of the description details mainly the features specific to the invention. Hereinafter, and throughout the text unless otherwise stated, each transporting device is described while considering that it is situated on the upper section 12, the receptacle being able to carry and transport an object. In particular, the terms "high" and "low" refer to such a position.

Each support 22 forms a foot 25 supporting a receptacle 20. Each support 22 thus carries a receptacle 20 suitable for receiving and for carrying at least one object such as a fruit, and for transporting it along said upper section. In the example shown, the receptacle 20 is an individual receptacle comprising a small dish 35 adapted to receive a single object. This small dish 35 has a hollow shape (with concavity oriented upwards at the upper section) conformed to that of the object to be transported. It may be in particular a hand (with fingers 36 fitting between discs 38 of adjacent rollers 37) as shown, a small cup or other receptacle.

Each receptacle 20 is mounted on a support 22 by a connecting mechanism configured to:
- interlock the receptacle and the support in longitudinal translation,
- permit a lateral tilting of the receptacle 20 to one side or the other, for the purpose of laterally discharging, opposite a receiving station, each object carried by the receptacle,
- and allow a relative displacement of the receptacle 20 in vertical translation with respect to the support 22 with a stroke adapted for the weighing of the receptacle and of the object which it carries: upwards for displacing it from a low, transporting position to a high, weighing position; then downwards from the high, weighing position so as not to induce any vertical reaction on the receptacle and not interfere with the weighing.

Each receptacle 20 and the support 22 on which it is mounted by this connecting mechanism constitutes an individual transporting device for an object. The receptacle 20 has, below the small dish 35, a base 23 assembled and guided with respect to the foot 25 of a support, in particular so as to be able to pivot with respect to the support 22 to one side or the other about a tilting axis 24 parallel to the longitudinal direction of the endless chain 11, and to be able to be vertically displaced between the low, transporting position and the high, weighing position. Preferably, the tilting axis 24 passes through a vertical longitudinal median plane of the endless chain 11 which is also a longitudinal median plane of the receptacle 20. The base 23 of the receptacle 20 is generally symmetrical with respect to the vertical longitudinal median plane passing through the tilting axis 24. The same applies to the foot 25 of the support 22.

In the example shown, the foot 25 of the support 22 is a vertical transverse end-plate in the general shape of a half-disc with a lower diametral base having:
- a central upper locking groove 45 for locking the receptacle 20 in the centred low, transporting position, this locking groove 45 being adapted to receive a mating central rib 46 of the receptacle 20 when the latter is in the low, transporting position, this central rib 46 projecting downwards in a central position of a groove bottom wall 47 of the receptacle oriented downwards,
- two vertical slots 50, one on each side of the locking groove 45, passing through the entire thickness of the end-plate, and each receiving a ball, named the anteroposterior ball 51, capable of vertical displacement in this slot 50 by rolling without sliding,
- lateral upper edges 52 extending laterally outwards beyond each vertical slot 50 and having, in a transverse plane, a general shape of an arc of a circle, for guiding the receptacle 20—in particular its central rib 46—sliding on one of these lateral upper edges 52 during a lateral tilting of the receptacle 20,
- a vertically oblong front housing 55, recessed in a front transverse vertical face 56, oriented downstream with reference to the longitudinal driving direction, of the end-plate so as to receive a front ball 57 capable of vertical displacement by rolling without sliding in this front housing 55,
- a vertically oblong rear housing 59, recessed in a rear transverse vertical face 60, oriented upstream with reference to the longitudinal driving direction, of the end-plate so as to receive a rear ball 61 capable of displacement from top to bottom by rolling without sliding on this rear housing 59,
- upstream of the front housing 55, a rear nipple 65 projecting from the rear face 60 of the end-plate upstream with reference to the longitudinal driving direction to penetrate into a vertically oblong rear housing 66, provided in a rear transverse vertical wall 68 of the base 23 of the receptacle 20 in order to form, with the front ball 57, a rotational guidance of the tilting of the receptacle 20 with respect to the support 22 and to define said tilting axis 24.

The base 23 of the receptacle 20 has below the small dish 35 a vertical groove 70 for receiving the end-plate of the foot 25 of the support 22. This vertical groove 70 is formed between a front transverse vertical wall 67 and said rear transverse vertical wall 68, and is delimited upwards by said groove bottom wall 47 oriented downwards.

This groove bottom wall 47 has a general shape of a portion of a circle so as to cover and follow, during a lateral tilting of the receptacle 20, the upper edges 52 of the end-plate forming the foot 25, the rib 46 projecting downwards from this groove bottom wall 47 sliding in contact with one of these upper edges 52 so as to guide the receptacle 20 during the tilting.

The front housing 55 integral with the support 22 recessed in the front face 56 of the end-plate has a pyramidal shape, with two inclined lateral flanks, an upper inclined flank and a lower inclined flank. It is oblong in order to extend vertically over a height greater than the diameter of the front ball 57. The width and the depth of this housing 55 and the inclination of its inclined lateral flanks are such that the front ball 57 is in contact with each of the inclined lateral flanks of this housing 55, and is laterally blocked by these flanks, but can freely roll without sliding on these flanks during the vertical displacements of the receptacle 20 with respect to the support 22.

The front transverse vertical wall 67 of the base 23 has a vertically oblong front housing 71, recessed in the rear transverse vertical face, oriented upstream, of this wall 67, this front housing 71 being adapted to receive the front ball 57, the latter being interposed and imprisoned between this front housing 71 integral with the receptacle 20 and the front housing 55 integral with the support 22.

The front housing 71 integral with the receptacle 20 recessed in the front transverse vertical wall 67 of the groove 70 of the base 23 also has a pyramidal shape, with two inclined lateral flanks, an inclined upper flank and an inclined lower flank. It is oblong in order to extend vertically over a height greater than the diameter of the front ball 57. The width and the depth of this housing 71 and the inclination of its inclined lateral flanks are such that the front ball 57 is in contact with each of the inclined lateral flanks of this housing 71, and is laterally blocked by these flanks, but can freely roll without sliding on these flanks during the vertical displacements of the receptacle 20 with respect to the support 22. The front housing 71 can be blind or partly pass through the thickness of the vertical wall 67, opening out on the front face oriented downstream of this vertical wall 67, a vertical oblong opening then being formed on this face.

The front ball 57 can roll without sliding on the inclined lateral flanks of the housings 55, 71, which constitute bearing surfaces of the receptacle 20 and of the support 22 permitting a vertical guidance of the receptacle 20 with respect to the support 22. In addition, the front ball 57 in contact with the inclined lateral flanks of the two housings 55, 71 opposite one another produces a blocking in lateral translation of the receptacle 20 with respect to the support 22 in every vertical position of the receptacle 20, including in the high, weighing position. But the front ball 57 in contact with the inclined lateral flanks of the two housings 55, 71 opposite one another forms a pivot allowing the rotation of the receptacle 20 with respect to the support 22 for the purpose of the lateral tilting. This pivot is also formed on the rear side by the nipple 65 which engages in the rear, vertically oblong, housing 66 recessed upstream in the rear wall 68 of the base 23 to receive this nipple 65. The height of this rear housing 66 corresponds to that of the front housing 71 of the front transverse vertical wall 67 of the base 23, so as to permit the displacements in vertical translation of the receptacle and of the support 22, on the one hand so that the central rib 46 of the base 23 can leave the locking groove 45 for locking the foot 25; on the other hand to be able to displace the receptacle 20 vertically upwards with respect to the support 22 from its low, transporting position as far as the high, weighing position as explained below.

The rear housing 59 of the end-plate of the foot 25 is situated above the nipple 65 and is sufficiently deep to house the rear ball 61, the latter being able to come into contact with the front, plane, face of the rear wall 68 of the base 23 in order to be able to roll without sliding on this front face both during the vertical displacements of the receptacle 20 and during its tilting. This rear ball 61 serves in particular for stabilising the receptacle 20 during the weighing in the event of imbalance of the latter downstream, and must neither impede nor limit the lateral tilting of the receptacle 20. A slight longitudinal clearance is therefore preferably provided in the rear housing 59 to permit the rotation of the rear ball 61 in this rear housing 59. To this end, the longitudinal spacing between the back of this rear housing 59 and the front face of the rear wall 68 of the base 23 is slightly greater (by a value not zero but as low as possible, typically less than 1 mm) than the diameter of the rear ball 61. The rear ball 61 can also serve as a limit stop for the lateral displacement of the receptacle 20 if the rear wall 68 of the base 23 is equipped with ribs (not shown) projecting downstream coming to bear against this rear ball 61 at the limit of tilting travel.

The vertical slots 50 of the end-plate of the foot 25 support 22 are laterally spaced from one another and symmetrical to one another with respect to a median longitudinal vertical plane of this foot 25. The two vertical slots 50 extend in a same transverse plane and at the top part of the foot 25.

The rear free transverse vertical face of the front wall 67 of the base 23 of the receptacle 20 extends in front of the vertical slots 50 and has a front vertical bearing surface against which the anteroposterior ball 51 of each of these vertical slots 50 can come to bear and on which this anteroposterior ball 51 can roll without sliding. The front free transverse vertical face of the rear wall 68 of the base 23 of the receptacle 20 extends behind the vertical slots 50 and has a rear vertical bearing surface 74 against which the anteroposterior ball 51 of each of these vertical slots 50 can come to bear and on which this anteroposterior ball 51 can roll without sliding. Each anteroposterior ball 51 is enclosed in the vertical slot 50 and has a diameter greater than the thickness of this vertical slot 50 in the longitudinal direction so as to be able to come into contact with one of these front and rear vertical bearing surfaces 73, 74. The longitudinal spacing of the front and rear vertical bearing surfaces 73, 74 of the front and rear walls 67, 68 of the base 23 of the receptacle 20 is greater than the diameter of the anteroposterior ball 51 so that this ball 51 is continually in contact with only one of these bearing surfaces 73, 74 of the base 23 and can roll without sliding on the latter. Again, the longitudinal clearance provided between each anteroposterior ball 51 and the front and rear vertical bearing surfaces 73, 74 of the front and rear walls 67, 68 of the base 23 is not zero and as low as possible, typically less than 1 mm, to permit the rolling without sliding of the anteroposterior ball 51. Each front and rear vertical bearing surface 73, 74 can be simply plane, or formed with a slight recess in the corresponding wall 67, 68 to maintain the receptacle 20 in rotation about the tilting axis 24, this being able to be overridden by the control for lateral tilting of the receptacle 20.

Each vertical slot 50 has vertical opposite flanks 53 having in horizontal cross-section a global V-shape, mating with the curvature and size of the anteroposterior ball 51, so as to retain this anteroposterior ball 51 in the vertical slot 50 in the longitudinal direction, while forming flat rolling tracks with minimum contact and friction with this ball 51. The free upper end of each vertical slot 50 opening out at the upper edge 52 of the end-plate of the foot 25 is preferably equipped with a narrowing lug 54, on one side at least, for preventing the anteroposterior ball 51 from coming out of the vertical slot 50 upwards, while permitting its insertion into the vertical slot 50 during assembly by elastic deformation of the narrowing lug 54 with force.

The assembly of a receptacle 20 on the support 22 of a device according to the embodiment shown in the figures can be carried out in the following manner. With the support 22 being placed with the end-plate of the foot 25 extending horizontally and upwards (longitudinal direction oriented vertically), the rear ball 61 is placed in the rear housing 59 of the foot 25, the front ball 57 in the front housing 71 of the base 23, and the end-plate of the foot 25 is engaged in the groove 70 of the base 23 by inserting the nipple 65 into the rear housing 66 with force, by elastic deformation. To facilitate this elastic engagement, the nipple 65 advantageously has an upper inclined face 69 and the rear wall 68 of the base 23 also has an inclined face 72 cooperating with the inclined face 69 of the nipple 65. The nipple 65 thus permits locking of the base 23 of the receptacle 20 to the foot 25 of the support 22. Then the anteroposterior balls 51 are inserted into each vertical slot 50 after laterally tilting the receptacle 20 to free the upper opening of each of these vertical slots 50. The front wall 67 of the base 23 also advantageously has an inclined face 78 cooperating with the front ball 57 for the engagement of the base 23 on the foot 25 if this front ball 57 has been previously placed in the front housing 55 of the foot 25.

The base 23 also has two lateral legs 75 extending on each side of the latter downwards to present lower free ends forming tilting heels 76 suitable for cooperating with a tilting cam 77 integral with a rotary rod of an electromagnet 79 integral with the frame 10 of the conveying device, so as to bring about the tilting of the receptacle 20 about the tilting axis 24 for the purpose of laterally discharging the object towards a receiving station. While it is not energised, the electromagnet 79 keeps the cam 77 in the inactive position in which it does not interfere with the heel 49, 50 of the receptacles 20.

The groove 70 is advantageously open upwards on the sides as in the example shown in order to lighten the receptacle 20. It can just as well be closed at its upper end and as far as the lateral legs, which then has the advantage of protecting the connecting mechanism and the balls from splashes and dirt, in particular coming from the small dish 35.

In the embodiment shown in FIG. 5, the cam 77 is in the active position in a vertical plane. In the inactive position the cam 77 extends in a horizontal plane distant from the leg 76 so as not to interfere with the latter. When it is energised, the electromagnet 79 places the cam in the vertical active position, so that this cam 77 presents a ramp 80 inclined with respect to the longitudinal direction and into contact with which comes the heel 76 of a receptacle 20 owing to its longitudinal displacement. In so doing, the cam 77 pushes away the heel, causing the receptacle 20 to tilt by disengaging the rib 46 from the locking groove 45, after which the receptacle 20 continues to tilt under the effect of its own weight about the tilting axis 24. The heel 76 advantageously has an inclined front face 81 oriented downstream for cooperating with an inclined ramp of a cam 77.

An electromagnet 79 is provided opposite each receiving station 19 so as to permit the control of the tilting of the receptacles 20 opposite one another of each of these receiving stations 19, according to the result of the optical analysis and the weighing carried out beforehand. The electromagnets 79 of the different receiving stations 19 can be arranged alternately on one side and the other of the conveying line, the receptacles 20 tilting to one side or the other, depending on the receiving station 19 to be supplied.

The heels 76 of the lateral legs 75 of the receptacle 20 serve also for weighing the latter. This inclined face 81 is continued upstream by a horizontal weighing face 82 adapted for coming onto a weighing slide 83 extending on the side of the endless chain 11 at the weighing station 17. To this end, each heel 76 is continued upstream of the front inclined face 81 by a rear horizontal weighing face 82, the two horizontal faces 82 of the receptacle 20 being strictly in the same horizontal plane when the receptacle is in the low, transporting position. The weighing station 17 has lateral weighing slides 83, each having a portion 84 inclined upwards downstream, on which a front inclined face 81 comes to slide in order to drive the receptacle 20 in vertical translation upwards as far as its high, weighing position. The inclined portion 84 of each lateral weighing slide 83 is continued by a horizontal portion 85 on which the horizontal face 82 of the heel 76 comes to slide as the endless chain is displaced in the longitudinal driving direction. The horizontal portions 85 of the two slides 83 are at the same height and are connected to a weighing cell 86 arranged below the horizontal rail of the upper outward section 12 of the endless chain. In this way, the weight of the receptacle 20 and of the object which it is transporting is transmitted via the legs 75 and the heels 76 of the receptacle 20 to the lateral weighing slides 83 and to the weighing cell 86. In this high, weighing position, the receptacle 20 is not subjected to any vertical reaction on the part of the connecting mechanism for connecting this receptacle 20 to the support 22, by virtue of the fact that this connecting mechanism connects the support 22 to the receptacle 20 only via the balls 51, 57, 61. This results in a perfectly precise and accurate weighing.

It should be noted that the horizontal weighing face 82 of the heel 76 is offset upstream with respect to the centre of gravity of the receptacle 20, so that the latter tends to tilt downstream when it is in the high, weighing position, thereby making it possible to eliminate the longitudinal clearances, the rear wall 68 of the base 23 coming into contact with the anteroposterior balls 51 and the rear ball 61. Furthermore, in a variant not shown, each horizontal weighing face 82 can advantageously have a longitudinal rib projecting downwards or a central lug projecting downwards making it possible on the one hand to facilitate the sliding of this horizontal weighing face 82 on the weighing slide 83 and to increase the precision of the weighing, while avoiding any offset of the contact between the horizontal weighing face 82 and the weighing slide 83.

Each roller 21 is formed of a plurality of coaxial parallel discs 38 mounted to rotate on a transverse shaft 39 guided in free rotation and in vertical translation with respect to the support 22. To this end, the support 22 comprises a clevis 40 having a vertical slot 41 receiving the transverse shaft 39.

The discs 38 can pass through the spaces provided between the fingers 36 of the hands 35. The discs 38 have shapes and/or dimensions adapted to form a housing for receiving an object between two adjacent rollers. These may, for example, be truncated cones (the roller being a bicone or double cone for conforming in shape to the outer surface of an object received between two adjacent rollers 21) and/or cylindrical discs. Each roller 21 can have a pair of discs or a number of discs greater than two, in particular three disc as in the example shown (two outer discs of larger diameter in the general shape of cones and an inner central disc of smaller diameter). The rollers 21 are adapted to be able to roll on rails of the frame of the device and/or to be able to be driven in rotation by belts coming into contact with these rollers.

The discs 38 are made of material adapted to be able to come into contact with an object such as a fruit, to support it without the risk of damaging it, and to drive it in rotation when the roller is driven in rotation by belts at the optical analysing station 16 equipped with at least one camera 28, connected to a computing unit (not shown). Thus, the objects received between the rollers 21 can, when they are carried by the latter, be driven to rotate so as to permit the optical analysis of their different outer faces. The discs 38 can be at least partly interlocked in rotation with one another and/or at least partly independent in rotation from one another, so that it is possible to drive discs of a same roller 21 at different speeds, and even in opposite directions.

Upstream of the optical analysing station 16, the rollers are displaced upwards by means of inclined ramps 90 cooperating with the outer discs 38 or with lateral extensions of the shaft 39 of the rollers 21. In the example of FIG. 1 these ramps 90 are placed at the end of the upper outward section 12, the rollers 21 being blocked (for example by a resilient blocking lug of the clevis cooperating with the rotation shaft) in this position on the return section 13 until they return to the optical analysing station 16. In this position of the rollers 21 on the outward section, the objects are supported by the rollers 21, and not by the receptacles 20 which are at a lower level, the objects not coming into contact with these receptacles. On passing the optical analysing station 16, the rollers 21 are driven in rotation by belts 91 which are themselves driven in displacement by a motorised device and which cooperate with the outer discs 38, of greater diameter, of the rollers 21 or with lateral extensions of the shaft 39 of the rollers 21.

Downstream of the optical analysing station 16, the rollers are displaced vertically downwards, as far as their lower position. In so doing, the objects which were supported between the rollers 21 are deposited on the small dishes 35 of the receptacles 20, and supported by the latter.

At the exit from the weighing station 17, the sorting station 18 brings about a discharging of the objects into one or the other of the receiving stations 19 provided for this purpose, according to predetermined criteria and depending on the results of the optical analysis and the weighing. It should be noted that a single receiving station 19 is shown in FIG. 1 but that the conveying device comprises in general several receiving stations juxtaposed along the outward section 12 for carrying out the sorting of the objects. The discharging is carried out by tilting the receptacle 20 carrying an object about the tilting axis 24, by actuation of an electromagnet 79 which places a discharging cam 77 on the path of the appropriate heel 76 as described above.

A transporting device according to the invention formed of a receptacle 20 assembled on its support 22 has a small number of parts, namely the support 22, the receptacle 20, a roller 21, and four balls, that is to say in total seven parts in the embodiment shown in the figures. Each of these parts can be formed of moulded synthetic material, with optionally metal reinforcing inserts. The guidance of the receptacle 20 with respect to the support 22 is particularly efficient, precise, simple, and compatible with a precise and accurate weighing of the transported objects.

The invention may be subject to numerous embodiment variants with respect to the single embodiment described above and shown in the figures. In particular, the number and arrangement of the balls may be different. Moreover, in the connecting mechanism of the embodiment shown in the figures and described above, the base 23 of the receptacle covers the vertical end-plate of the foot 25 of the support 22. Nevertheless, in contrast, provision may be made for the base of the receptacle to be inserted inside a groove formed in the foot of the support 22. Likewise, provision may be made for the tilting axis for tilting the receptacle with respect to the support to be fixed with respect to the support and not movable in vertical translation with the receptacle as in the embodiment shown in the figures and described above.

Numerous other embodiment variants of the connecting mechanism are conceivable, given that the latter comprises at least one ball interposed between vertical bearing surfaces of the receptacle and of the support for guiding the receptacle in vertical translation, and avoiding any transmission of a reaction of the support to the receptacle in the high, weighing position.

The invention also applies to other objects than fruits or vegetables and to other object conveying and weighing devices than sorting devices.

The invention claimed is:

1. Object transporting device comprising a receptacle suitable for receiving at least one object, a support which can to be associated with a driving device for driving along a direction, named the longitudinal driving direction, and a connecting mechanism for connecting the receptacle to the support, this connecting mechanism being configured to:
   interlock the receptacle and the support in longitudinal translation,
   permit a lateral tilting of the receptacle for the purpose of laterally discharging each object carried by the receptacle,
   and allow a relative displacement of the receptacle in vertical translation with respect to the support with a stroke adapted for the weighing of the receptacle and of the object(s) which it carries,
   wherein said connecting mechanism comprises at least one ball interposed and imprisoned between at least one bearing surface of the receptacle and at least one bearing surface of the support in order to be able to roll without sliding vertically on at least one of these bearing surfaces.

2. Device as claimed in claim 1, wherein at least one bearing surface of the receptacle is a vertical, at least partly transverse bearing surface.

3. Device as claimed in claim 2, wherein at least one bearing surface of the support is a vertical, at least partly transverse bearing surface.

4. Device as claimed in claim 2, wherein the connecting mechanism for connecting a pair of parts formed of a receptacle and of a support has:
   a front vertical bearing surface and a rear vertical bearing surface of one of these two parts, these front and rear vertical bearing surfaces being spaced from one another along the longitudinal direction,
   at least one ball, named the anteroposterior ball, enclosed in a vertical slot of the other part passing through the thickness of the latter in the longitudinal direction, this anteroposterior ball having a diameter less than the spacing of said front and rear vertical bearing surfaces, and greater than the thickness of said vertical slot in the longitudinal direction so as to be able to come into contact with one of the front and rear vertical bearing surfaces.

5. Device as claimed in claim 2, wherein the connecting mechanism for connecting a pair of parts formed of a receptacle and of a support has at least one front ball interposed and imprisoned between at least one front bearing surface of the receptacle and at least one front bearing surface of the support in order to be able to roll without sliding vertically on and between these front bearing surfaces.

6. Device as claimed in claim 1, wherein at least one bearing surface of the support is a vertical, at least partly transverse bearing surface.

7. Device as claimed in claim 6, wherein the connecting mechanism for connecting a pair of parts formed of a receptacle and of a support has:
- a front vertical bearing surface and a rear vertical bearing surface of one of these two parts, these front and rear vertical bearing surfaces being spaced from one another along the longitudinal direction,
- at least one ball, named the anteroposterior ball, enclosed in a vertical slot of the other part passing through the thickness of the latter in the longitudinal direction, this anteroposterior ball having a diameter less than the spacing of said front and rear vertical bearing surfaces, and greater than the thickness of said vertical slot in the longitudinal direction so as to be able to come into contact with one of the front and rear vertical bearing surfaces.

8. Device as claimed in claim 6, wherein the connecting mechanism for connecting a pair of parts formed of a receptacle and of a support has at least one front ball interposed and imprisoned between at least one front bearing surface of the receptacle and at least one front bearing surface of the support in order to be able to roll without sliding vertically on and between these front bearing surfaces.

9. Device as claimed in claim 1, wherein the connecting mechanism for connecting a pair of parts formed of a receptacle and of a support has:
- a front vertical bearing surface and a rear vertical bearing surface of one of these two parts, these front and rear vertical bearing surfaces being spaced from one another along the longitudinal direction,
- at least one ball, named the anteroposterior ball, enclosed in a vertical slot of the other part passing through the thickness of the latter in the longitudinal direction, this anteroposterior ball having a diameter less than the spacing of said front and rear vertical bearing surfaces, and greater than the thickness of said vertical slot in the longitudinal direction so as to be able to come into contact with one of the front and rear vertical bearing surfaces.

10. Device as claimed in claim 9, wherein said connecting mechanism has two vertical slots spaced laterally from one another, each comprising at least one anteroposterior ball.

11. Device as claimed in claim 10, wherein the two vertical slots extend in a same transverse plane and at a top part of said other part.

12. Device as claimed in claim 1, wherein the connecting mechanism for connecting a pair of parts formed of a receptacle and of a support has at least one front ball interposed and imprisoned between at least one front bearing surface of the receptacle and at least one front bearing surface of the support in order to be able to roll without sliding vertically on and between these front bearing surfaces.

13. Device as claimed in claim 1, wherein the connecting mechanism for connecting a pair of parts formed of a receptacle and of a support has at least one rear ball interposed and imprisoned between at least one rear bearing surface of the receptacle and at least one rear bearing surface of the support in order to be able to roll without sliding vertically on and between these rear bearing surfaces.

14. Device as claimed in claim 1, wherein the connecting mechanism for connecting a pair of parts formed of a receptacle and of a support comprises a pivot with a longitudinal axis permitting a lateral tilting of the receptacle to at least one side of the support for the purpose of discharging the objects.

15. Device as claimed in claim 14, wherein said longitudinal pivot is at least partly formed of a ball interposed between a vertical bearing surface of the receptacle oriented upstream with reference to the longitudinal driving direction and a vertical bearing surface of the support oriented downstream with reference to the longitudinal driving direction.

16. Device as claimed in claim 1, wherein the connecting mechanism is adapted to permit a tilting of the receptacle to each side of the support.

17. Device as claimed in claim 1, wherein each receptacle is a small dish adapted to receive individually an object.

18. Object conveying and weighing device comprising:
- an endless chain having a horizontal upper section,
- a driving device for driving with continuous running of the endless chain along a longitudinal driving direction of said upper section,
- object transporting devices distributed along the endless chain, carried by the latter and interlocked in translation with the latter,
- at least one weighing station comprising, on said upper section of the endless chain:
    - at least one slide arranged along a portion of said upper section of the endless chain in order to be able to cooperate with the receptacles so as to displace them with respect to the supports vertically upwards into the high, weighing position,
    - and at least one weighing device for weighing the receptacles in the high, weighing position,
- wherein each object transporting device is a device as claimed in claim 1.

19. Device as claimed in claim 18, wherein each receptacle is interposed on the endless chain between two rollers mounted freely rotatably about transverse axes of rotation driven in translation along the longitudinal direction by said endless chain.

20. Device as claimed in claim 19, wherein said endless chain is formed by the supports of the transporting devices articulated to one another in pairs successively in the longitudinal direction, each support thus forming a link of the chain, and wherein each support of a transporting device carries a receptacle and an adjacent roller.

* * * * *